(12) United States Patent
Belanger et al.

(10) Patent No.: US 8,016,914 B2
(45) Date of Patent: Sep. 13, 2011

(54) ADSORPTION CONTROL METHOD AND CONTROLLER

(75) Inventors: Paul W. Belanger, Clarence Center, NY (US); Mohamed Safdar Allie Baksh, Wheatfield, NY (US); Preeti Chandra, Buffalo, NY (US); Andrew C. Rosinski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 297 days.

(21) Appl. No.: 12/410,523

(22) Filed: Mar. 25, 2009

(65) Prior Publication Data

US 2010/0242722 A1 Sep. 30, 2010

(51) Int. Cl.
*B01D 53/047* (2006.01)
*C01B 3/56* (2006.01)

(52) U.S. Cl. .......... 95/8; 95/96; 96/111; 96/115; 96/132

(58) Field of Classification Search .............. 95/8, 96, 95/128, 139, 140; 96/109, 111, 115, 121, 96/132
See application file for complete search history.

(56) References Cited

U.S. PATENT DOCUMENTS

| | | | |
|---|---|---|---|
| 3,703,068 A | 11/1972 | Wagner | |
| 4,127,395 A | 11/1978 | McKey et al. | |
| 4,546,442 A * | 10/1985 | Tinker | 96/114 |
| 4,552,570 A * | 11/1985 | Gravatt | 95/10 |
| 4,693,730 A * | 9/1987 | Miller et al. | 95/8 |
| 4,859,217 A | 8/1989 | Chao | |
| 5,037,458 A * | 8/1991 | Trepaud | 96/109 |
| 5,174,979 A | 12/1992 | Chao et al. | |
| 5,258,056 A | 11/1993 | Shirley et al. | |
| 5,413,625 A | 5/1995 | Chao et al. | |
| 5,454,857 A | 10/1995 | Chao | |
| 5,529,607 A | 6/1996 | Tan | |
| 5,674,311 A | 10/1997 | Notaro et al. | |
| 5,698,013 A | 12/1997 | Chao | |
| 6,277,174 B1 | 8/2001 | Neu et al. | |
| 6,340,382 B1 | 1/2002 | Baksh et al. | |
| 6,454,838 B1 | 9/2002 | Xu et al. | |
| 6,503,299 B2 | 1/2003 | Baksh et al. | |
| 6,733,568 B2 | 5/2004 | De-Souza et al. | |
| 7,025,801 B2 | 4/2006 | Monereau | |
| 7,169,210 B2 | 1/2007 | Baksh et al. | |
| 7,179,324 B2 | 2/2007 | Baksh et al. | |
| 2006/0130650 A1 | 6/2006 | Givens | |

FOREIGN PATENT DOCUMENTS

EP 2 111 905 A1 10/2009
WO WO 2004/058630 A2 7/2004

* cited by examiner

*Primary Examiner* — Frank Lawrence, Jr.
(74) *Attorney, Agent, or Firm* — David M. Rosenblum

(57) ABSTRACT

The present invention provides a method and a control system for controlling an adsorbent bed unit in which an adsorbent bed concentration of an impurity within an adsorbent bed of the adsorbent bed unit is measured. The adsorbent bed concentration is controlled by manipulating the feed cycle time during which an adsorbent bed is adsorbing the impurities to maintain the adsorbent bed concentration at a targeted adsorption bed concentration. The targeted adsorption bed concentration is determined such that the product impurity concentration is maintained at product impurity concentration targets. The method and control system can incorporate a supervisory level of control reactive to product impurity concentration levels and related targets to determine the targeted adsorption bed concentration and a primary level of control that calculates the feed cycle time based upon an error between the measured and targeted adsorption bed concentrations. Proportional integral control can be used for such purposes.

17 Claims, 6 Drawing Sheets

ADSORPTION CONTROL METHOD AND CONTROLLER

FIELD OF THE INVENTION

The present invention relates to a method of controlling an absorption unit containing one or more adsorption beds to adsorb one or more impurities within a feed stream, thereby to produce a product stream and a controller to accomplish such method. More particularly, the present invention relates to such method and controller in which a concentration of an impurity within an adsorbent bed is sampled and a feed cycle time during which the adsorbent bed is adsorbing impurities is manipulated such that the concentration measured within the bed approaches a target that ensures that the product stream will be produced at a specific purity level.

BACKGROUND OF THE INVENTION

There are a variety of processes that employ adsorbents that are capable of adsorbing one or more impurities contained within a feed stream more readily than other impurities within the feed stream to produce a product stream having a lower concentration of the impurities than the feed stream. The adsorbent is contained within an adsorption bed and one or more adsorption beds can be utilized in such processes. For example, such process can be used to purify a hydrogen containing stream from a reformer. In such case, water vapor, carbon dioxide, carbon monoxide, other hydrocarbons and nitrogen are present within the feed stream. The hydrogen is the less readily adsorbed component and as such constitutes the product stream. The impurities or components, water vapor, carbon dioxide and etc. are the more readily adsorbed components and are removed from the feed stream through adsorption to produce the product stream. The adsorbent or adsorbents are located within an adsorbent bed that can consist of a vessel having one or more layers of adsorbent. In case of a hydrogen containing stream, the adsorbent bed could be provided with an initial layer of alumina to adsorb the water vapor, a layer of activated carbon to adsorb the carbon dioxide and heavier hydrocarbons and a final layer of a zeolite adsorbent to adsorb the carbon monoxide and nitrogen.

In any adsorption process, a time is reached at which the adsorbent is fully laden with the impurity or impurities and the adsorbent bed must be regenerated. As such, adsorption processes employ a cycle during which an adsorption bed is on-line and adsorbing the impurities or components and then, is subsequently off-line and being regenerated. Adsorption processes can be distinguished by the cycle employed, for example, pressure swing adsorption, temperature swing adsorption and vacuum pressure swing adsorption. In the example given above regarding the production of a hydrogen product stream, the cycle employed is pressure swing adsorption.

In pressure swing adsorption two or more adsorbent vessels containing the adsorbent beds are employed in an out of phase cycle so that while one bed is adsorbing the impurities, another or other beds can be regenerated. A pressure swing adsorption cycle can have the elements of adsorption in which it is supplying a product, depressurization by way of one or more equalization steps followed by a step in which the bed provides purge gas to another bed to cause desorption of adsorbed components from the bed. A blow down step in which the inlet end of the bed is opened to discharge adsorbed components followed by a purge step with purge gas provided by another bed to further desorb components from the adsorbent of the adsorbent bed. This is followed by one or more equalization steps in which the adsorbent bed is partially repressurized and a product repressurization step in which the adsorbent bed is fully repressurized and able to be brought back on line. Each adsorbent bed is subjected to all elements of the cycle and as such product is continually being delivered. In a temperature swing adsorption process, the adsorbent bed is regenerated by heating the adsorbent bed to a high temperature with a hot gas to reduce the capacity of the adsorbent and thereby to cause the impurities to be desorbed. After having been heated, the adsorbent bed is cooled prior to being brought back on-line. In vacuum pressure swing adsorption, an adsorbent bed is at least in part regenerated under vacuum. For example, an adsorbent that will readily adsorb nitrogen, carbon dioxide and water vapor is used in such a cycle to produce oxygen. Such a process can utilize a single adsorption bed and therefore, the product is discharged into a surge tank so that produce may be continually produced. Multiple adsorbent beds can also be used in such a process to produce the product at a higher rate than a single adsorbent bed.

In any such adsorption process the adsorbent bed or beds are connected to a flow control network having valves to subject the beds to the various steps of the particular cycle. The valves within the flow control network for an adsorption unit conducting the process discussed above, or other process are controlled to open and close to subject each of the adsorbent beds to the production and regeneration over prespecified time periods. As known in the art, however, the feed to the adsorbent beds is subject to such upsets as flow, concentration and temperature variations that can result in the product stream not meeting a product specification or in other words, having product impurity concentrations that are at too high a level. It is known that a primary means for controlling product purity is to adjust the feed cycle time that each adsorbent bed spends in the adsorption step. If the product impurity concentration within the product stream is too high, the feed cycle time is shortened. On the other hand, if the product impurity concentration is below a target, the feed cycle time is lengthened to in turn increase the production of the product. Conventionally, the operator monitors the product impurity concentration and then manually adjusts the feed cycle time. This can be automated through a feedback control system. In both cases, however, there will be a lag in a change in the product purity following an upset or in other words, the change in purity upon the occurrence of an upset will not be instantaneous. As such, in case of either manual or automated control, the target at which a control action is taken will be selected so that the product will never exceed the product specification. The result of this is that the feed cycle time on average will be shorter than would be required to actually meet the product specification and therefore, the production rate of the product will be less than could otherwise be obtained. Feed forward control systems have also been used in which the feed composition and flow are measured on-line. A major problem with such a system is that a model or models must be used to gauge the effect of such changes in the feed on the product purity are not perfect and therefore, again, the targets will be conservatively selected with the result of lower production rates.

U.S. Pat. No. 4,693,730 provides a control system in which a characteristic of the effluent from an adsorbent bed undergoing a depressurization is sensed and then a corrective action is taken in response to the sensed characteristic. For example, the sensed characteristic could be the impurity level in the effluent and the corrective action could be to change the feed cycle time. In the control system contemplated in this patent, the effluent concentration is compared to a target. After the target has been reached, if the product gas impurity level is not at the desired value, an error between the actual and desired value is used to calculate a new target value. However, such effluent concentration will not experience an instantaneous change upon an upset and therefore, the target selected will be a conservative target.

U.S. Pat. No. 7,025,801 discloses a control method for a pressure swing adsorption unit in which the flow rate of the feed stream is monitored and upon an increase in flow rate that would tend to drive the product purity off its specification, the cycle time is reduced and vice-versa. Additionally, the purity of the product stream is also measured. Upon an increase in product purity above the product specification, the cycle time is reduced and vice-versa. Upon an increase in concentration of the impurity within the feed stream without an increase in flow rate and upon data from a controller indicative of such event, the cycle time is adjusted and possibly other steps within the pressure swing adsorption cycle. Thus, the method of this patent contemplates both feed back and feed forward control having the drawbacks outlined above.

As will be discussed, among other advantages, the present invention provides a control method and system for controlling an adsorption unit in which impurity concentration is sensed within the adsorbent bed itself rather than in a feed stream, a product stream or an effluent stream. The change in such impurity concentration upon an upset will be more rapid than in the feed, effluent or product. As a result, targets are able to be selected that are less conservative than in the prior art resulting in longer cycle times and higher production rates.

SUMMARY OF THE INVENTION

The present invention, in one aspect, provides a method of controlling an adsorbent bed unit. In accordance with such method, an adsorbent bed concentration of an impurity is measured within an adsorbent bed of the adsorbent bed unit. The adsorbent bed adsorbs the impurity from a feed stream fed into the adsorbent bed, thereby to produce a product stream containing a product concentration of the impurity no greater than a targeted product concentration. The adsorbent bed unit is operated in accordance with a cycle during which the feed stream is fed to the adsorbent bed and thereafter, the adsorbent within the adsorbent bed is regenerated through desorption of the impurity and the cycle incorporates at a feed cycle time during which the feed stream is introduced into the adsorbent bed, the impurity is adsorbed and the product stream is produced.

The product concentration within the product stream is controlled by manipulating the feed cycle time employed within the adsorbent bed unit so that the adsorbent bed concentration tends to approach a targeted adsorbent bed concentration that will maintain the product concentration at a level no greater than the targeted product concentration. In this regard, the feed cycle time is manipulated so that the feed cycle time will decrease as the adsorbent bed concentration increases and will increase as the adsorbent bed concentration decreases.

The adsorbent bed concentration is measured within the adsorbent bed, at a location thereof, at which the adsorbent bed concentration will change before the product concentration of the impurity within the product stream changes in response to a disturbance so that controlling the adsorbent bed concentration to maintain the adsorbent bed concentration at the targeted adsorbent bed concentration will also maintain the product concentration of the impurity within the product stream at level no greater than the targeted product concentration.

In an embodiment of the present invention, the adsorbent bed can be configured to adsorb at least two impurities. As such, the impurity mentioned above is one impurity of the at least two impurities, the product concentration is one product concentration of at least two product concentrations and the targeted product concentration is one targeted product concentration of at least two targeted product concentrations. The at least two product concentrations and the adsorbent bed concentration are measured and the feed cycle time is manipulated by continually calculating a control parameter that will set the feed cycle time within an adsorbent bed unit controller and the control parameter is inputted into the adsorbent bed unit controller. The adsorbent bed unit controller is designed to control valves within a flow control network connected to the adsorbent bed so that the feed stream is fed to the adsorbent bed during the feed cycle time.

The control parameter is calculated in such embodiment so that the adsorbent bed concentration will approach the targeted adsorbent bed concentration when the control parameter is inputted into the adsorbent bed unit controller. The targeted adsorbent bed concentration is determined by calculating potential targeted adsorbent bed concentrations for each of the at least two impurities such that the product stream is produced having the at least two product concentrations at levels no greater than the at least two targeted product concentrations. A minimum value of the potential targeted adsorbent bed concentrations is used as the targeted adsorbent bed concentration so that control of the adsorbent bed concentration will also control all of the at least two product impurity concentration to be less than the at least two targeted product impurity concentrations.

In another specific embodiment of the present invention, the impurity is a first impurity, the adsorbent bed concentration is a first adsorbent bed concentration, the product concentration is a first product concentration and the targeted product concentration is a first targeted product concentration. The adsorbent bed is configured to adsorb the first impurity and also a second impurity in a first layer of the adsorbent bed and a third impurity in a second layer of the absorbent bed located adjacent to and upstream of the first layer. The adsorbent bed concentration that is controlled by manipulation of the feed cycle time is the first adsorbent bed concentration of the first impurity within the first layer so that the first adsorbent bed concentration will tend to approach the first targeted adsorbent bed concentration. The first product impurity concentration and a second product impurity concentration of the second impurity are measured within the product stream, the first adsorbent bed concentration is measured in the first layer and a second adsorbent bed concentration of the third impurity is measured in the second layer at another location thereof selected so that a measurement of the third impurity concentration will indicate a change in impurity level before break though of the second impurity to the first layer.

In such other embodiment, the feed cycle time is manipulated by continually calculating a control parameter that will set the feed cycle time within an adsorbent bed unit controller. The control parameter is inputted into the adsorbent bed unit controller. The adsorbent bed unit controller controls valves within a flow control network connected to the adsorbent bed so that the feed stream is fed to the adsorbent bed during the feed cycle time. The control parameter is calculated so that the first adsorbent bed concentration will approach the first targeted adsorbent bed concentration when the control parameter is inputted into the adsorbent bed unit controller.

Additionally, the first targeted adsorbent bed concentration is determined by calculating potential first targeted adsorbent bed concentrations for the first impurity, the second impurity and the third impurity such that the product stream is produced having the first product impurity no greater than the first targeted product concentration and the second product concentration of the second impurity no greater than a second targeted product concentration and the second adsorbent bed concentration will be no greater than a second targeted adsorption bed concentration selected so as to prevent break through of the third impurity to the first layer. A minimum value of the potential targeted adsorbent bed concentrations is then used as the targeted adsorbent bed concentration so that control of the first adsorbent bed concentration will also control the first product concentration, the second product concentration and the second adsorbent bed concentration to be less than the targeted first product impurity concentration, the targeted second product impurity concentration and the targeted second impurity concentration, respectively.

In either of the two specific embodiments of the present invention, discussed above, the control parameter can be continually calculated within a product purity controller having a supervisory level of control that includes supervisory controllers to calculate the potential targeted adsorbent bed concentrations and a primary level of control that includes a primary controller to calculate the control parameter. The product purity controller continually executes at a controller frequency and each of the supervisory controller and the primary controllers are proportional integral controllers.

In another aspect of the present invention, a control system for an adsorbent bed unit is provided. In such control system, a sampling portal is located within an adsorbent bed of the adsorbent bed unit for sampling an adsorbent bed concentration of an impurity within the adsorbent bed. The adsorbent bed adsorbs the impurity from a feed stream fed into the adsorbent bed during a feed cycle time, thereby to produce a product stream containing a product concentration of the impurity no greater than a targeted product concentration. A gas analyzer is operatively associated with the sampling portal and configured to generate data referable to the adsorbent bed concentration. A product purity controller, responsive to the data, is configured to calculate a control parameter that will set a feed cycle time employed within the adsorbent bed unit so that the adsorbent bed concentration will be controlled by the control parameter to approach a targeted adsorbent bed concentration that will maintain the product concentration of the impurity at the level no greater than the targeted product concentration. The control parameter is calculated so that the feed cycle time decreases as the adsorbent bed concentration increases and increases as the adsorbent bed concentration decreases. The sampling portal is situated at a location of the adsorbent bed at which the adsorbent bed concentration will change before the product concentration of the impurity within the product stream changes in response to a disturbance so that controlling the adsorbent bed concentration to approach the targeted adsorbent bed concentration will also maintain the product concentration of the impurity within the product stream at level no greater than the targeted product concentration.

An adsorbent bed unit controller is responsive to the control parameter calculated by the product purity controller. The adsorbent bed unit controller controls valves within a flow circuit of the adsorbent bed unit such that the adsorbent bed unit is operated in accordance with a cycle during which the feed stream is fed to the adsorbent bed during the feed cycle time and thereafter, the adsorbent within the adsorbent bed is regenerated through desorption of the impurity.

In a specific embodiment of the control system, the adsorbent bed is configured to adsorb at least two impurities. As such, the impurity mentioned above is but one impurity of the at least two impurities, the product concentration is one product concentration of at least two product concentrations and the targeted product concentration is one targeted product concentration of at least two targeted product concentrations. Further, the gas analyzer is one gas analyzer of a plurality of gas analyzers that are positioned to generate data referable to the at least two product concentrations in the product stream and the adsorbent bed concentration.

The product purity controller continually executes at a controller frequency to calculate the control parameter and includes a supervisory level and a primary level of control. The supervisory level of control is configured to calculate the targeted adsorbent bed concentration from a minimum value of potential targeted adsorbed bed concentrations calculated within at least two supervisory controllers. The at least two supervisory controller are responsive to the data referable to the at least two product concentrations and are configured to calculate the potential targeted adsorbent bed concentrations such that the product stream is produced having the at least two product concentrations no greater than the at least two targeted product concentrations. The primary level of control has a primary controller responsive to a portion of the data referable to the adsorbent bed concentration and to the targeted adsorbent bed concentration calculated by the supervisory level of control. The primary controller is configured to calculate the control parameter from the adsorbent bed concentration and the targeted adsorbent bed concentration.

In another specific embodiment of the present invention, the impurity is a first impurity, the adsorbent bed concentration is a first adsorbent bed concentration, the product concentration is a first product concentration and the targeted product concentration is a first targeted product concentration. The adsorbent bed is configured to adsorb the first impurity and also a second impurity in a first layer of the adsorbent bed and a third impurity in a second layer of the absorbent bed located adjacent to and upstream of the first layer. As such, the adsorbent bed concentration is a first adsorbent bed concentration of the first impurity within the first layer so that the first adsorbent bed concentration will tend to approach a first targeted adsorbent bed concentration, the product stream is produced also having a second product concentration of the second impurity no greater than a second targeted product concentration and a second adsorbent bed concentration of the third impurity within the second layer will be no greater than a second targeted adsorption bed concentration selected so as to prevent break through of the third impurity to the first layer.

The sampling portal is a first sampling portal and a second sampling portal is situated at a location of the adsorbent bed to sample the second adsorbent bed concentration of the third impurity within the second layer. The gas analyzer is one gas analyzer of a plurality of gas analyzers positioned to generate data referable to the first product concentration, the second product concentration, the first adsorbent bed concentration and the second adsorbent concentration.

The product purity controller continually executes at a controller frequency and has a supervisory level of control and a primary level of control. The supervisory level of control is configured to calculate the first targeted adsorbent bed concentration from a minimum value of potential first targeted adsorbent bed concentrations calculated within supervisory controllers responsive to the data referable to the first product concentration, the second product concentration and the second adsorbent bed concentration. The supervisory controller are configured to calculate the potential first targeted adsorbent bed concentrations such that the product stream is produced having the first product impurity concentration and the second product impurity concentration no greater than the first targeted product concentration and the second product targeted concentration, respectively and the second adsorbent bed concentration is no greater than a second targeted adsorbent bed concentration. The primary level of control has a primary controller responsive to a portion of the data referable to the first adsorbent bed concentration and to the first targeted adsorbent bed concentration calculated within the supervisory level of control and configured to calculate the control parameter from the first adsorbent bed concentration and the first targeted adsorbent bed concentration.

In any embodiment of the present invention and in any aspect thereof that incorporates supervisory and primary levels of control to control first and second product impurities and a second adsorbent bed impurity level of a third impurity, each of the proportional and integral controller have a proportional element and an integral element. Each proportional element and each integral element have tuning factors. Each of the supervisory controllers calculates a potential first targeted adsorbent bed concentration of the potential first targeted adsorbent bed concentrations by adding to a previously calculated potential first targeted adsorbent bed concentration, the proportional element and the integral elements. Each of the proportional and integral elements has an error term. The first product concentration, the second product concentration, the first adsorbent bed concentration and the second adsorbent bed concentration are each continually measured and converted into logarithmic, base ten values that are averaged to produce an average logarithmic value. The error term is calculated in a first of the supervisory controllers related to the first impurity by subtracting the average logarithmic value of the first product concentration from a base ten logarithm of the first targeted product concentration. The error term in a second supervisory controller related to the second impurity is calculated by subtracting the average logarithmic value of the second product concentration from a base ten logarithm of the second targeted production concentration and the error term in a third of the supervisory controllers related to the third impurity is calculated by subtracting the average logarithmic value of the second adsorbent bed concentration from a base ten logarithm of the second targeted adsorbent bed concentration. The error term is calculated in the primary controller by subtracting the average logarithmic value of the first adsorbent bed concentration from a base ten logarithm of the first targeted adsorbent bed concentration.

Additionally, the proportional element can incorporate a difference between the error calculated during a current execution of the supervisory controllers and the primary controller and the error calculated during a prior execution of the supervisory controllers and the primary controller. The period of the controller frequency can be set equal to a current total cycle time of the adsorbent bed unit. Moreover, the integral element can be further determined by multiplying the current error by the current total cycle time.

Both the method and control system can be applied in an environment in which the cycle is a pressure swing adsorption cycle and the adsorbent bed is one of a plurality of adsorbent beds. The feed stream can be a hydrogen containing stream and the product stream can be a hydrogen product stream. In such case, the first impurity is carbon monoxide, the second impurity is nitrogen and the third impurity is carbon dioxide. In order to adsorb such impurities, the first layer contains a zeolite adsorbent and is located adjacent to an outlet of the adsorbent bed. The second layer contains an activated carbon adsorbent to adsorb the carbon dioxide.

BRIEF DESCRIPTION OF THE DRAWINGS

While the specification concludes with claims distinctly pointing out the subject matter that Applicants regard as their invention, it is believed that the present invention will be better understood when taken in connection with the accompanying drawings in which:

DETAILED DESCRIPTION

Figure 1:
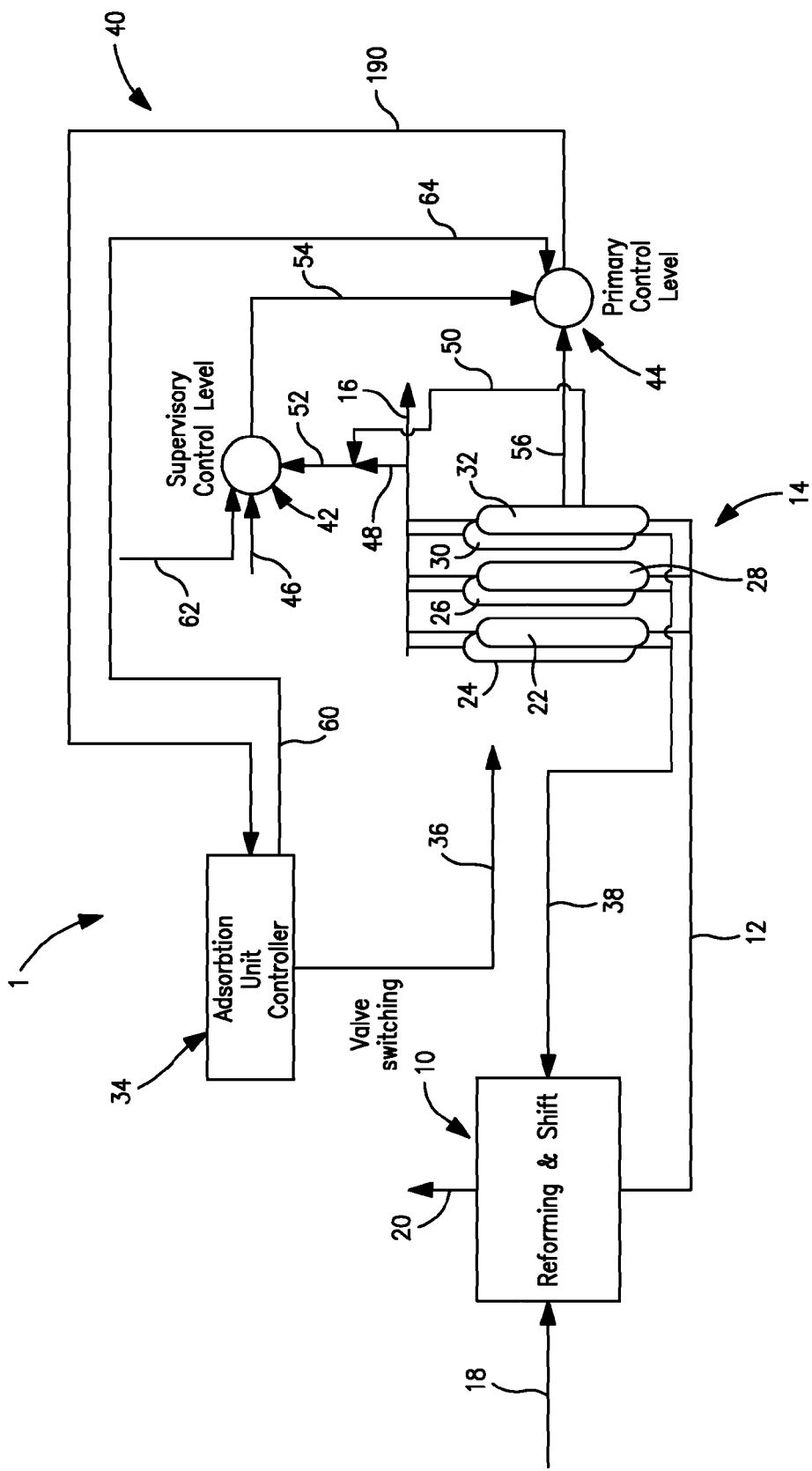
FIG. 1 is a schematic view of a control system for carrying out a method in accordance with the present invention illustrated in connection with a pressure swing adsorption unit used in production of hydrogen from a shifted stream generated in a steam methane reforming facility.

With reference to FIG. 1, a facility 1, such as a refining facility, is illustrated having a steam methane reformer 10 that produces a feed stream 12 that predominantly contains hydrogen and impurities that range from between about 5 percent and about 25 percent by volume carbon dioxide, less than about 0.5 percent by volume water vapor, less than about 3 percent by volume methane, less than about 1 percent by volume carbon monoxide, less than about 1 percent by volume nitrogen and smaller concentrations of heavier hydrocarbons. Feed stream 12 is introduced into a pressure swing adsorption unit 14 to adsorb the impurities and thus produce a hydrogen product stream 16 that contains the aforementioned impurities in amounts that are less than that allowed by a product specification. It is to be noted that the discussion of facility 1 that follows is not meant to be limiting on the use of the present invention in that the present invention is equally applicable to the control of other types of adsorption units that are designed to adsorb other types of impurities and function in accordance with other types of adsorption cycles, for example, vacuum pressure swing adsorption and temperature swing adsorption that contain a single or multiple adsorbent beds.

Steam methane reformer 10 subjects a hydrocarbon containing stream 18, for example, natural gas to steam methane reforming. In steam methane reformer 10, the sulfur species are removed from the hydrocarbon containing stream 18 and superheated steam is added to produce a reactant stream that is in turn introduced into catalyst filled reformer tubes located in a fired, radiant heat exchange section of the steam methane reformer 10. The hydrocarbons react with the steam to produce hydrogen and carbon monoxide that is further reacted in a water-gas shift reactor to produce the feed stream 12. Flue gas from the radiant section of the steam methane reformer is used to raise the superheated steam in a convective section of steam methane reformer 10 from which a stack gas stream 16 is discharged.

Feed stream 12 is introduced into an adsorption unit 14 that has six adsorbent beds 22, 24, 26, 28, 30 and 32 that operate in accordance with a pressure swing adsorption cycle to be discussed hereinafter. The adsorption unit 14 is further provided with an adsorption unit controller 34 to produce control signals, generally indicated by arrowhead 36, to control a valve within a flow control network in which the adsorbent beds 22 through 32 are incorporated and thereby to subject the adsorbent beds 22 through 32 to the pressure swing adsorption cycle. Each of the adsorbent beds 22 through 32 is in turn placed on-line to adsorb impurities within feed stream 12 and as a result, produce a hydrogen product stream 16. Additionally, each of the adsorbent beds is regenerated to desorb the impurities previously adsorbed and thus produce a tail gas stream 38. Tail gas stream 38 is in turn used to fire burners within the radiant section of steam methane reformer 10 and also, can be routed to a fuel header within the facility 1.

The purity of product stream 16 is controlled by a product purity controller 40 configured and operating in accordance with the present invention. Product purity controller 40 is provided with a supervisory level of control 42 and a primary level of control 44 to compute a feed cycle time during which each of the adsorbent beds 22 through 32 is on-line and adsorbing impurities within feed stream 12 or other control parameter that will have a direct effect on the feed cycle time. As will be discussed in more detail hereinafter, the supervisory level of control 42 computes a targeted adsorbent bed concentration of carbon monoxide to be achieved within adsorbent bed 32 based upon target product impurity concentrations of nitrogen and carbon monoxide within product stream 16 and a targeted impurity concentration of carbon dioxide within adsorbent bed 32. These aforesaid targets are fed into the supervisory level control as generally indicated by arrowhead 46. Arrowhead 46 represents three different targets to be discussed, namely, a carbon monoxide targeted product impurity concentration 158, a nitrogen targeted production impurity concentration 166 and a carbon dioxide targeted adsorbent bed impurity concentration 172 that are input into three separate controllers incorporated into the supervisory level of control 42. These targets are compared with actual measurements of carbon monoxide and nitrogen within product stream 16 as generally indicated by arrowhead 48 and actual measurements of adsorbent bed impurity concentrations of carbon dioxide within adsorbent bed 32 as indicated by arrowhead 50. Data referable to each of the actual concentration levels are then inputted into the supervisory level of control 42 as shown by arrowhead 52. As will be discussed, arrowhead 48 is made up of data referable to the carbon monoxide product impurity concentration 48*a* and nitrogen product impurity concentration 48*b* also to be discussed hereinafter. The supervisory level of control 42 then computes a targeted adsorption bed concentration for the carbon monoxide concentration that will result in the product stream 16 having concentrations of nitrogen and carbon monoxide no greater than their respective targeted concentration and the carbon dioxide concentration within adsorbent bed 32 no greater than its targeted adsorbent bed concentration. As will also be discussed hereinafter, the illustrated supervisory control level 42 and the primary control level 44 function in accordance with proportional integral control logic. As will be discussed, other types of control logic can be used in accordance with the present invention.

The targeted adsorption bed concentration for carbon monoxide in adsorbent bed 32 is then fed into the primary level of control 44 as indicated by arrowhead 54. From such target and an actual measurement of carbon monoxide concentration within adsorbent bed 32, that is also fed as an input 56 into the primary level of control 44, a bed cycle time is computed that will cause the carbon monoxide concentration within adsorbent bed 32 to approach the targeted carbon monoxide concentration computed by the supervisory level of control. Since this targeted adsorption bed concentration is based upon the product impurity concentrations of nitrogen and carbon monoxide, the adsorbent bed impurity concentration of the carbon dioxide and their related targets, control of the carbon monoxide concentration will control impurity levels of the nitrogen and carbon monoxide in the product stream 16 and carbon dioxide concentration within adsorbent bed 32.

The computed feed cycle time is then introduced into the adsorption bed unit controller 34 as an input 58 and therefore, each of the other adsorbent beds are 22 through 30 are controlled in the same manner. As also indicated in FIG. 1, the total bed cycle time 60 can also be inputted into the supervisory level of control 42 and the primary control level 44 as inputs 62 and 64 for purposes that will be discussed hereinafter. The data transmitted as the total bed cycle time 60 can include data indicative of the total cycle time that an adsorbent bed begins its on-line service adsorbing impurities and is off-line and being regenerated as well as an indication that the cycle has been completed. Additionally, although the supervisory level of control 42, the primary control level 44 and the adsorption unit controller 34 are illustrated as separate units, they could all be in a single unit or the adsorption unit control 34 would be a separate controller provided by a manufacturer of adsorbent bed unit 14 and the supervisory control level 42 and the primary control level 44 could be in a separate controller programmable for such purposes.

Figure 2:
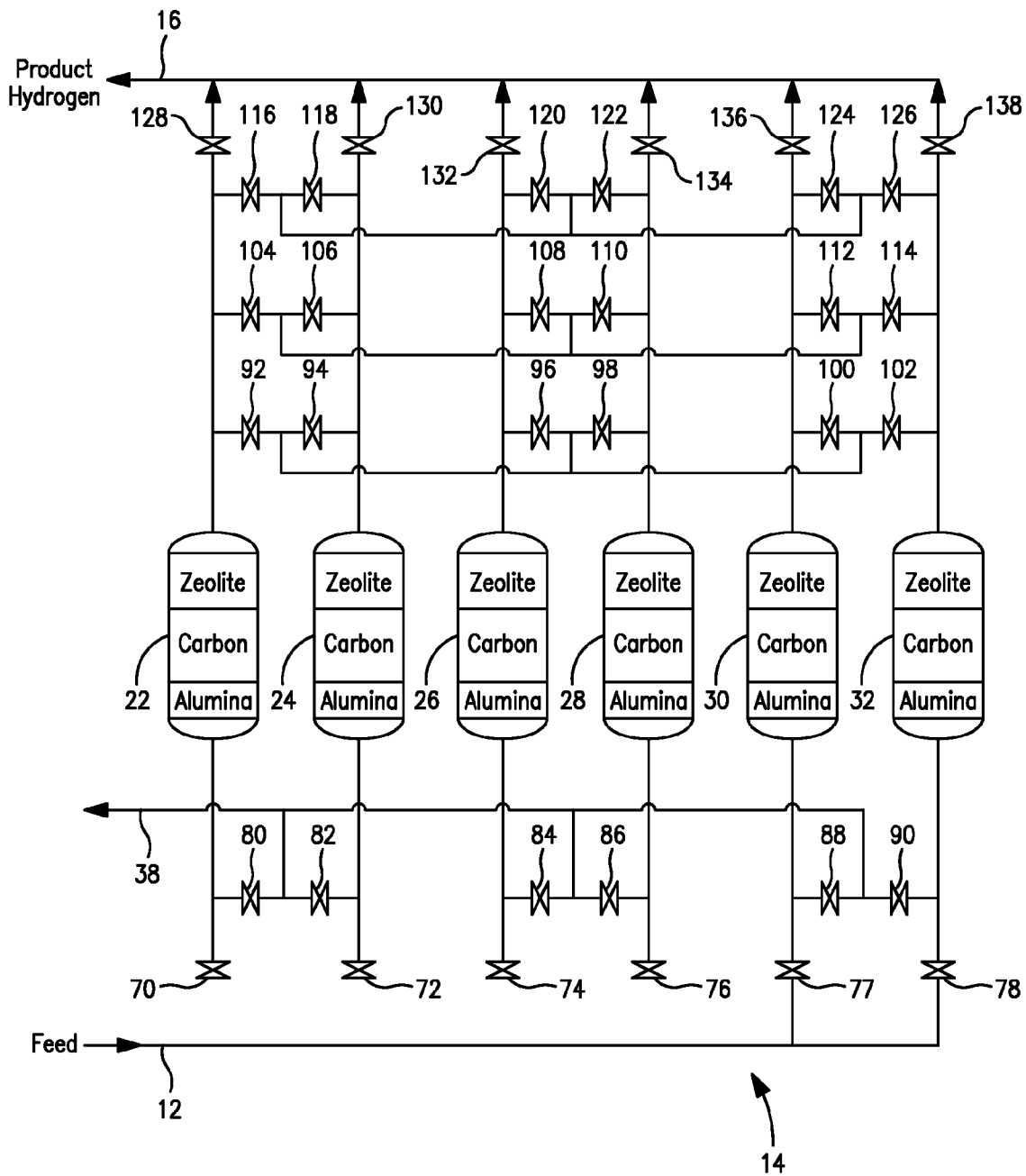
FIG. 2 is a schematic view of a pressure swing adsorption unit used in FIG. 2.

With reference to FIG. 2, an explanation will be given with respect to the operation of flow control network of adsorbent bed unit 14, briefly discussed above, again for purposes of illustration and not limitation. Conventional electrical connections between valves and adsorbent bed unit control 34 have not been shown for ease of explanation. Further all valves in the following discussion are assumed to be closed unless specifically indicated as being open during a particular stage of the pressure swing adsorption cycle. In this regard, the cycle in its entirety has twelve stages in which during two stages an adsorbent bed is on-line and producing and in the latter of the two stages, the on-line adsorbent bed is repressurizing another adsorbent bed to be brought on-line. After the two stages, the adsorbent bed is brought off-line and regenerated by being subjected to three successive pressure equalization steps referred to as equalization down steps in which pressure within the adsorbent bed is decreased and void space gas is supplied to other adsorbent beds to partly repressurize such beds prior to be brought back on-line. This is followed by a provide purge gas step in which a purge gas is discharged from the adsorbent bed to another adsorbent bed undergoing a purge step to remove adsorbed components from the adsorbent bed. The provide purge gas step is followed by a blow down step in which the adsorbent bed is despressurized to atmospheric pressure through the inlet end to cause adsorbed components to desorb to supply the tail gas for the tail gas stream 38 and then a purge step in which the purge gas is supplied to the outlet end of the adsorbent bed to cause the adsorbed components to further desorb and be discharged through the inlet so that the tail gas continues to be supplied. After this, there are three successive equalizations referred to as equalization up steps in which the pressure increases within the bed and then a product repressurization step in which the adsorbent bed is brought back up to operating pressure and in the next stage is brought back on-line.

Specifically, in a first stage of the cycle, adsorbent bed 22 is in a first adsorption step and being fed with feed stream 12 to produce the product stream 16. At the same time, adsorbent bed 24 is undergoing a third equalization up step with adsorbent bed 30 in which adsorbent bed 30 is discharging gas into adsorbent bed 24 and is thus undergoing a third and final equalization down step. The third adsorbent bed 26 is undergoing the first equalization up step with adsorbent bed 32 in which equalization gas of adsorbent bed 32 undergoing its first equalization down step is being discharged into adsorbent bed 26. Adsorbent bed 28 is undergoing blowdown and is discharging the desorbed impurities to form tail gas stream 38. Valves 70, 86, 108, 114, 118, 124 and 128 are set in open positions for such purposes. In the second stage of the cycle, adsorbent bed 22 is undergoing a second adsorption step and is also supplying product gas to adsorbent bed 24 that is undergoing a product pressurization step with part of the product being produced from adsorbent bed 22. Adsorbent bed 26 is undergoing a second equalization step with adsorbent bed 32 which is undergoing a second equalization down step. Adsorbent bed 28 is undergoing a purge step with adsorbent bed 30 that is in the provide purge gas step. Valves 70, 128, 86, 108, 114 and 118 remain in open positions, valves 98, 100 and 116 are set in open positions and valve 124 is reset in the closed position.

In the third stage of the cycle, adsorbent bed 24 having been repressurized is now supplying the product in the formation of the product stream 16. Adsorbent bed 22 now is being regenerated by being subjected to a first equalization down step in which it supplies equalization gas to adsorbent bed 28 that is in the first equalization up step. Adsorbent bed 26 is undergoing the third equalization up step in which it is receiving gas from adsorbent bed 32 that is therefore in the third equalization down step. Adsorbent bed 30 is in a blowdown step. For such purposes valves 72, 88, 104, 110, 120, 126 and 130 are set in open positions. Valves 70, 128, 86, 108, 114, 118, 98, 100 and 116 are reset into closed positions. In the forth stage of the cycle, adsorbent 22 is undergoing the second equalization down step and sending equalization gas to adsorbent bed 28 that is undergoing the second equalization up step, while adsorbent bed 24 is making product and sending product pressurization gas to adsorbent bed 26. Adsorbent bed 30 is in a purge step and receiving purge gas from adsorbent bed 32 which is in the provide purge gas step. Valves 72, 88, 104, 110, 120 and 130 remain in the open positions and valves 100, 102 and 118 are set in open positions. Valve 126 is reset into the closed position.

In the fifth stage of the cycle, adsorbent bed 26 is now making the product gas and as such is now on-line producing product stream 16. In this stage, adsorbent bed 22 is undergoing the third equalization down step with adsorbent bed 28 by providing equalization gas to adsorbent bed 28 which is undergoing the third equalization up step. Adsorbent bed 24, now off-line, begins regeneration by undergoing the first equalization step by providing equalization gas to adsorbent bed 30 that is undergoing the first equalization up step. Adsorbent bed 32 is in a blow down stage supplying the tail gas to tail gas stream 38. For such purposes, valves 74, 90, 106, 116, 122, and 132 are set in open positions and valves 72, 88, 104, 110, 120, 130, 100, 102 and 118 are reset in closed positions. In the sixth stage of the cycle, adsorbent bed 22 is in a provide purge gas step with adsorbent bed 32 which is now in the purge step. Adsorbent bed 24 undergoes a second equalization down step by sending equalization gas to adsorbent bed 30 that is undergoing the second equalization up step. Adsorbent bed 24 is sending some of the product as a product pressurization gas to adsorbent bed 28. Valves 74, 90, 106, 122 and 132 remain open, valves 92, 102 and 120 are set in open positions and valve 116 is set to the closed position.

In the seventh stage of the cycle, adsorbent bed 28 is now producing the product and adsorbent bed 24 is taken off-line. Adsorbent bed 22 is undergoing a blow down step. During this time adsorbent bed 24 is undergoing the third equalization down step by providing equalization gas to adsorbent bed 30 that is undergoing a third equalization up step. Adsorbent beds 26 and 32 are undergoing the first bed to bed equalizations with adsorbent bed 26 undergoing a first equalization down step to supply equalization gas to adsorbent bed 32 that undergoes the first equalization up step. Valves 76, 80, 108, 114, 118, 124 and 134 are set in open positions. Valves 74, 90, 106, 122, 132, 92, 102 and 120 are returned to the closed position. In the eighth stage of the cycle, adsorbent bed 28 continues to make product and to provide product pressurization to adsorbent bed 30. Adsorbent bed 22 is now in a purge step by receiving purge gas from adsorbent bed 24 which is therefore in the provide purge gas step, and adsorbent beds 26 and 32 are undergoing the second bed to bed equalization with adsorbent bed 26 undergoing the second equalization down step supplying equalization gas to adsorbent bed 32 undergoing the second equalization up step. Valves 76, 80, 108, 104, 124 and 134 remain in the open position, valves 92, 94 and 122 are set in the open position and valve 118 is reset to the closed position.

In the ninth stage of the cycle, adsorbent bed 30 is brought on-line and adsorbent bed 28 is taken off-line to be regenerated. Adsorbent bed 22 is undergoing the first equalization up step by receiving equalization gas from adsorbent bed 28 that is undergoing the first equalization down step. During this time, adsorbent bed 24 is in the blow down step, adsorbent bed 26 is undergoing the third equalization down step by providing equalization gas to adsorbent bed 32 that is in the third equalization up step. Valves 77, 82, 104, 110, 120, 126 and 136 are set in open positions. In the tenth stage of the cycle, adsorbent bed 30 is providing product pressurization to adsorbent bed 32. Adsorbent bed 22 is undergoing the second equalization up step by receiving high pressure equalization gas from adsorbent bed 28 that is undergoing the second equalization down step. During the same time, adsorbent bed 26 is in the provide purge gas step to supply purge gas to adsorbent bed 24 that is in the purge step. Valves 77, 82, 104, 126 and 136 remain in open positions, valves 94, 96 and 124 are set in open positions and valve 120 is closed.

In the eleventh stage of the cycle, now adsorbent bed 32 is brought back on-line to provide product stream 16 and adsorbent bed 30 is taken off-line to be regenerated. During this time adsorbent bed 22 is in the third equalization up step by receiving equalization gas from adsorbent bed 28 that is undergoing the third equalization down step. Adsorbent bed 24 is undergoing the first equalization up step and receives equalization gas from adsorbent bed 30 that is in the first equalization down step. Adsorbent bed 26 is in the blow down step. Valves 78, 84, 106, 116, 122 and 138 are set in open positions and valves 77, 82, 104, 126, 136, 94, 96 and 124 are reset in closed positions. In the twelfth stage of the cycle, adsorbent bed 22 is receiving product pressurization gas from adsorbent bed 32 so as to be able to be brought back on-line. Adsorbent bed 24 undergoes a second equalization up step by receiving equalization gas from adsorbent bed 30 that is in the second equalization down step. Adsorbent bed 26 is in the purge step and receives purge gas sent by adsorbent bed 28 which is in the provide purge gas step. For such purposes 78, 84, 106, 116 and 138 remain in open positions, valves 96 and 98 are set in open positions and valve 122 is closed. After the conclusion of the twelfth stage, the cycle returns to the first stage and repeats as outlined above.

Figure 3:
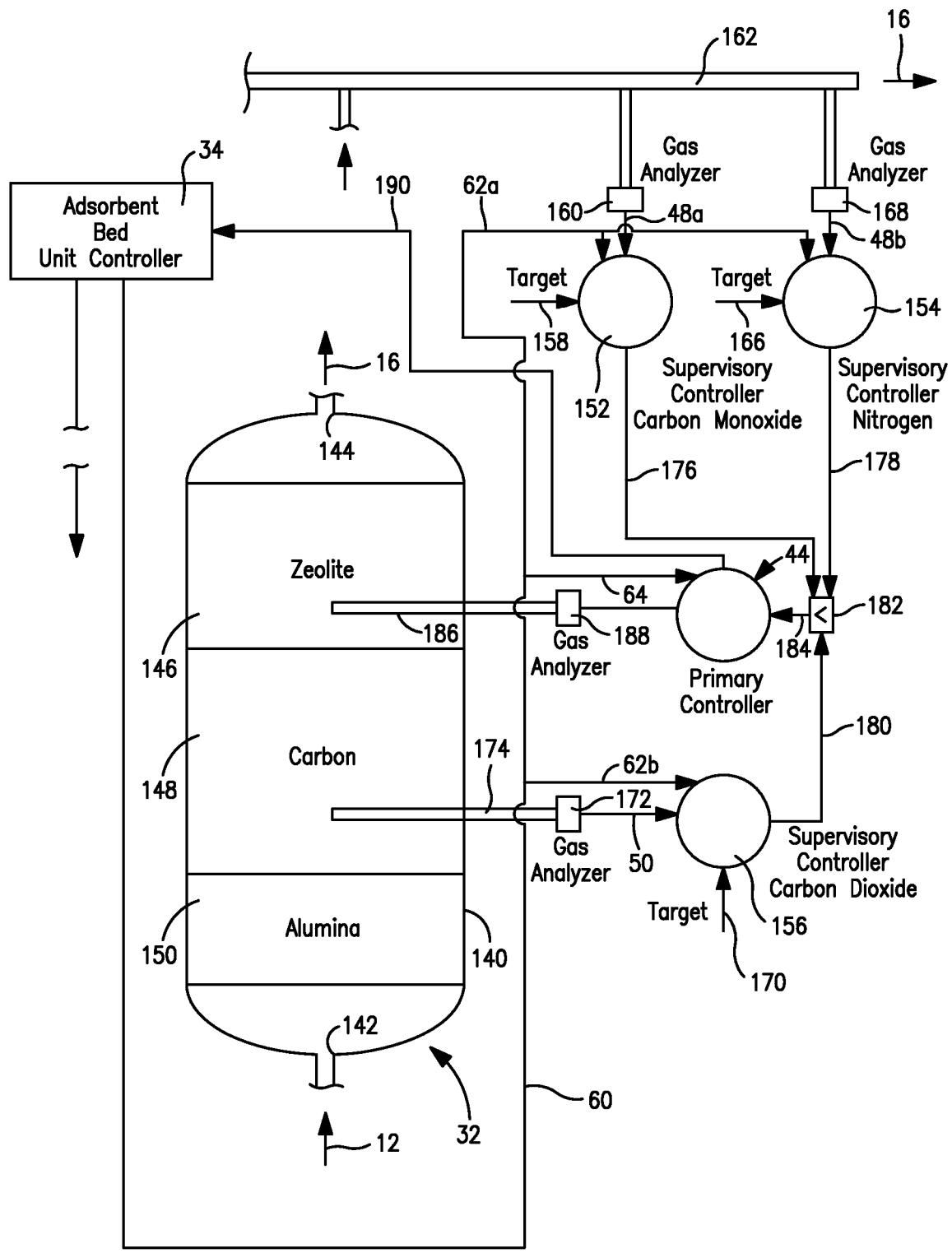
FIG. 3 is a schematic view of a preferred embodiment of a control system and method of the present invention employed in FIG. 1.

Having generally discussed the product purity controller and the adsorbent bed unit 14 and its control, a more detailed discussion concerning the product purity controller 40 follows. With particular reference to FIG. 3, product purity controller 40 is preferably a programmable logic controller that is capable of being programmed with control logic to represent the supervisory level of control 42 and the primary level of control 42 and specific controllers within such levels that will be discussed hereinafter. For example, the product purity controller 40 could be an ALLEN-BRADLEY® controller that utilizes programmable software, for example, RSLOGIX™ 500 software obtained from Rockwell Automation Inc. of 1201 South Second Street, Milwaukee, Wis. 53204-2496 USA. Other similar controllers could be used and the foregoing is for exemplary purposes only.

In the specific illustrated application of the present invention, adsorbent bed 32, as well as the other adsorbent beds 22 through 30, is provided with a vessel 140 having an inlet 142 and an outlet 144. Contained within adsorbent bed 32 are three layers of adsorbent, namely a zeolite layer 146, an activated carbon layer 148 and an optional alumina layer 150. The incoming shifted gas stream 12, first enters alumina layer 150 to adsorb moisture and then activated carbon layer 148 to adsorb carbon dioxide and heavier hydrocarbons such as methane. Thereafter carbon monoxide and nitrogen is adsorbed in the zeolite layer. It is important to note that the operation of the adsorption bed unit must be controlled so that the carbon dioxide never breaks through activated carbon layer 148 to zeolite layer 146. The reason for this is that the carbon dioxide would be strongly adsorbed in the zeolite bed making adsorbent bed 32 very difficult to regenerate. Another important control consideration is that if the carbon monoxide is above a level called for in the product specification, the product stream will not be of any practical use. Lastly, the nitrogen tends to concentrate in zeolite bed 146 towards the adsorbent bed outlet 144. As a consequence of all of these considerations, the adsorbent bed unit 14 is controlled so that the carbon dioxide never breaks through to the zeolite layer 146 and that the feed cycle time is controlled so that the carbon monoxide concentration in the product stream 16 will never rise above the level set forth in the product specification. The control of the carbon monoxide product concentration will also control the nitrogen product concentration. As will be discussed hereinafter, the carbon dioxide concentration and the carbon monoxide concentrations are sensed as adsorbent bed concentrations within the activated carbon layer 148 and the zeolite layer 146 and compared against targets because it has been found that changes in such adsorbent bed concentrations will appear much sooner than downstream changes and hence, the control can be made more aggressive to allow the feed cycle time to be on average as long as possible to maximize production of the product stream.

The supervisory level of control 42 utilizes three separate controllers, namely a carbon monoxide supervisory controller 152, a nitrogen supervisory controller 154 and a carbon dioxide supervisory controller 156. In the illustrated embodiment, these controllers function on the basis of proportional and integral control logic and consequently there are proportional and integral error terms that can be a function of the error and the integral of the error. However, in the illustrated embodiment a velocity form of such control is employed and as such, the proportional term is a function of a difference between the current error as determined during current execution of the controller and a prior error determined at the previous execution of the controller. The integral term, being of the velocity form, is a function of the current error.

Each of these controllers calculate a targeted adsorbent bed concentration for carbon monoxide concentration to be obtained in the zeolite bed that will maintain each of the carbon monoxide and nitrogen concentrations within the product stream 16 at and below targeted product impurity concentrations within the product stream 16 and a targeted adsorbent bed concentration, in case of carbon dioxide within the activated carbon bed 148, that will prevent breakthrough of the carbon dioxide into the zeolite layer 148.

Turning first to the carbon monoxide supervisory controller, such controller functions in accordance with the following equation:

$$MV1_i = MV1_{i-1} + K_{c1}*(\epsilon 1_i - \epsilon 1_{i-1}) + K_{c1}/\tau_{I1}*\Delta t*\epsilon 1_i$$

Where:
$MV1_i$=Potential CO targeted adsorbent bed concentration for current cycle
$MV1_{i-1}$=Potential CO targeted adsorbent bed concentration at same time last cycle
$K_{c1}$=gain for the CO intra-bed loop
$\epsilon 1_i$=error for current cycle for CO intra-bed
$\epsilon 1_{i-1}$=error at same time last cycle for CO intra-bed
$\tau_{I1}$=reset time for the CO intra-bed loop
$\Delta t$=total cycle time During each execution of the product purity controller 40, $MV1_i$ is calculated by adding to the value of the potential CO targeted adsorbent bed concentration determined during a previous execution of the product purity controller, $MV1_{i-1}$, the proportional and integral elements of the control. The proportional element, $K_{c1}*(\epsilon 1_i - \epsilon 1_{i-1})$, is determined by calculating the error for the current cycle, $\epsilon 1_i$, by subtracting the product impurity concentration for carbon monoxide from a targeted product impurity concentration set as an input within the carbon monoxide supervisory controller 152 as indicated by arrowhead 158. The concentration is determined by sampling the impurity concentration within product stream 16 by means of a gas analyzer 160 connected to a product header 162 of the adsorbent bed unit 14 and sending data referable to such concentration to the carbon monoxide supervisory controller 152 as indicated in arrowhead 48a. As will be discussed, arrowhead 48a actually represents several steps of control logic in which the data is converted into a logarithmic, base 10 form, a running average is maintained and the average is introduced into carbon monoxide supervisory controller 152. The error determined in the same manner during a previous execution of the product purity controller 40, $\epsilon 1_{i-1}$ is subtracted from the current error and the difference is multiplied by a tuning factor $K_{c1}$, known in the art as the "gain", that is determined in a known manner during operation of the product purity controller 40. The integral element is determined by multiplying the current error by a product of a quotient of $K_{c1}/\tau_{I1}$ and $\Delta t$ that is the current cycle time determined by adsorbent bed unit controller 34 that is inputted to the controller as indicated by arrowhead 62 and specifically as shown by arrowhead 62a. The term, "$\tau_{I1}$" is the reset time and is another turning factor that is determined during operation of the product purity controller 40 in a known manner.

The nitrogen supervisory controller 154 functions in accordance with the following equation:

$$MV2_i = MV2_{i-1} + K_{c2}*(\epsilon 2_i - \epsilon 2_{i-1}) + K_{c2}/\tau_{I2}*\Delta t*\epsilon 2_i$$

where:
MV2$_i$=Potential CO targeted adsorbent bed concentration for current cycle
MV2$_{i-1}$=Potential CO targeted adsorbent bed concentration at same time last cycle
K$_{c2}$=gain for the N2 product loop
$\epsilon 2_i$=error for current cycle for N2 product
$\epsilon 2_{i-1}$=error at same time last cycle for N2 product
$\tau_{I2}$=reset time for the N2 product loop
$\Delta t$=total cycle time The nitrogen supervisory controller 154 performs calculations in the same manner as carbon monoxide supervisory controller 152. However, for such controller the error, "$\epsilon$", is determined by subtracting a targeted nitrogen product impurity concentration, that is an input shown by arrowhead 166, from the product nitrogen impurity concentration measured in product stream 16 by a gas analyzer 168. Data representing the average concentration that has been converted to a logarithmic base 10 form is inputted into nitrogen supervisory controller 154 as shown by arrowhead 48$b$. The tuning factor "K$_{c2}$" is independently determined and set.

The carbon dioxide supervisory controller functions in accordance with the following equation:

$$MV3_i = MV3_{i-1} + K_{c3}*(\epsilon 3_i - \epsilon 3_{i-1}) + K_{c3}/\tau_{I3}*\Delta t*\epsilon 3_i$$

where:
MV3$_i$=Potential CO targeted adsorbent bed concentration for current cycle
MV3$_{i-1}$=Potential CO targeted adsorbent bed concentration at same time last cycle
K$_{c3}$=gain for CO product loop
$\epsilon 3_i$=error for current cycle for CO product
$\epsilon 3_{i-1}$=error at same time last cycle for CO product
$\tau_{I3}$=reset time for CO product loop
$\Delta t$=total cycle time The carbon dioxide supervisory controller 156 performs calculations in the same manner as carbon monoxide supervisory controller 152. However, for such controller the error, "$\epsilon$", is determined by subtracting a targeted carbon dioxide product impurity concentration, that is an input shown by arrowhead 170, from an adsorbent bed concentration of the carbon dioxide measured within the activated carbon layer 148 by a gas analyzer 172 that again transmits data representing an average of the measurements, converted into the logarithmic base 10 form, into the carbon dioxide supervisory controller 156 as shown by arrowhead 50. Gas analyzer 172 samples the carbon dioxide concentration through a gas portal 174 that is formed by a pipe situated at a location that is less than one-half the length of the activated carbon layer 148 and preferably at about one-third of such length so that changes in concentration will be sensed before a downstream change such as would occur at the interface between the zeolite layer 146 and the activated carbon layer 148. The tuning factors "K$_{c3}$" and "$\tau_{I3}$" are independently determined and set and the cycle time is an input as shown by arrowhead 62$b$.

The carbon monoxide supervisory controller 152, the nitrogen supervisory controller 154 and the carbon dioxide supervisory controller output their respect values of MV1$_i$, MV2$_i$ and MV3$_i$ as shown by arrowheads 176, 178 and 180 and then introduces such values into logic that compares the three values and determines a minimum as shown in box 182 and introduces the same as an input 184 into the primary controller 44. Primary controller 44 functions in accordance with the following equation:

$$MV4_i = MV4_{i-1} + K_{c4}*(\epsilon 4_i - \epsilon 4_{i-1}) + K_{c4}/\tau_{I4}*\Delta t*\epsilon 4_i$$

where:
MV4$_i$=total feed cycle time for current cycle
MV4$_{i-1}$=total feed cycle time at same time last cycle
K$_{c4}$=gain for the CO intra-bed loop
$\epsilon 4_i$=error for current cycle
$\epsilon 4_{i-1}$=error at same time last cycle
$\tau_{I4}$=reset time for the CO intra-bed loop
$\Delta t$=total cycle time The primary controller 44 functions in a manner similar to that of the controllers in the supervisory control level 42 except that its output is the feed cycle time. This output, MV4$_i$, is determined by adding to the feed cycle time determined during the prior execution of product purity controller 40, a proportional term having a tuning factor, "K$_{c4}$" and an integral term having a tuning factor "$\tau_{I4}$", both independently determined and applied in a manner known in the art and the total feed cycle time is delivered to the adsorption bed controller 36 as an input 64. The error term is the difference between the adsorbent bed concentration for the carbon monoxide and the targeted adsorbent bed concentration as input into such controller as indicated by arrowhead 184 or the minimum determined in the supervisory level of control 42. This adsorbent bed concentration is determined by a sampling portal 186 connected to a gas analyzer 188 that generates data referable to such concentration that serves as an input into primary controller 44. Sampling portal 186 is situated at a location within zeolite layer 146 closer to inlet 142 than outlet 144, again, within the first half of the layer and preferably, within the first third of the layer. The output, the feed cycle time, MV4$_i$, is input into the adsorbent bed unit controller 34 as shown by arrowhead 190.

Figure 4:
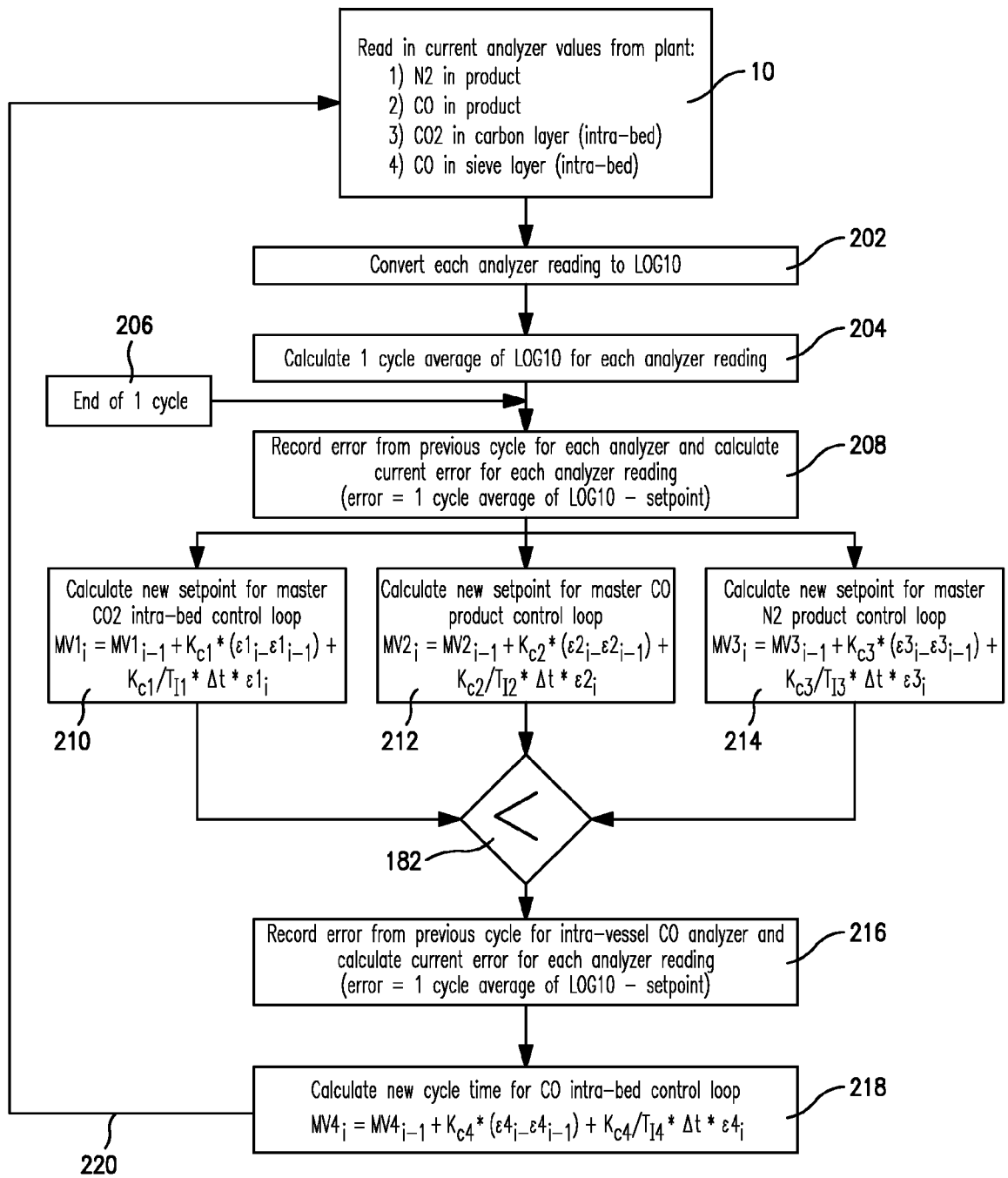
FIG. 4 is a control logic diagram of the control system and method illustrated in FIG. 3.

With reference to FIG. 4, the logic of the programming of product purity controller 40 is illustrated. Product purity controller 40 executes at a controller frequency that is equal to the total cycle time of the absorbent bed unit 14, namely, the total time between the point that adsorbent bed 22 is brought on-line and is adsorbing impurities until, is regenerated and then brought on-line again. During this time, as illustrated in logic step 200, the current values of product concentrations of the nitrogen and carbon monoxide within product stream 16 ("N2 in product" and "CO in product") along with the current adsorbent bed concentrations of carbon dioxide and carbon monoxide within the activated carbon and zeolite layers 148 and 146 ("CO$_2$ in carbon layer" and "CO in sieve layer") are read in from the gas analyzers discussed above or from a supervisory control and data acquisition program that records such readings. Each of the values is converted to a logarithmic base 10 ("LOG10") value as shown in logic step 202. A running average of the converted LOG10 values is maintained as shown in logic step 204. At the end of the complete cycle of the adsorbent beds within the adsorbent bed unit, a cycle end command is transmitted to the programmable logic controller from the adsorption bed unit controller 36 that also contains the cycle time "$\Delta t$" for use by the controllers as indicated by logic step 206 and an error is calculated for each of the variables by recording the error from the previous cycle and calculating the current error from the average as shown in logic step 208. It is to be noted that the cycle end command and the cycle time is transmitted as indicated by reference number 60 in FIG. 1. In this regard, if a single controller were used, it could be programmed in a known manner to transmit the relevant values "on" and "off" and the cycle time to the supervisory and primary control functions of such program. Further, if adsorption unit controller 34 were a separate unit, then a separate timer could be attached to controller 34 for such purposes or if available, relevant data from such separate unit could be transmitted to the product purity controller 40.

The calculated values are then used in the computation of the potential targeted adsorbent bed concentrations for the carbon monoxide, namely, $MV1_i$, $MV2_i$ and $MV3_i$ as shown in logic steps 210, 212 and 214 that emulate the supervisory controllers, 170, 158 and 156. The results are compared and a minimum is found as shown in 182 and the same is inputted into logic step 216 that contains the calculations performed by the primary controller 44. As shown in logic step 216, the error from the previous cycle is recorded and an error is computed by subtracting the minimum targeted carbon monoxide concentration from the average LOG10 value of the carbon monoxide impurity concentration within the zeolite bed that has been previously calculated in logic step 204. The feed cycle time is then calculated in logic step 218 and the output $MV4_i$ is then introduced into the adsorbent bed unit controller 34 as the feed cycle time. As shown by arrowhead 220, execution of the programming returns to logic step 200 and the product purity controller executes the steps outlined above. As is apparent, a period of the controller frequency is coincident with the total cycle time of the adsorption bed unit 14 as controlled by adsorption bed unit controller 36.

In an example of the advantageous operation of the present invention, an adsorbent bed unit of the type illustrated herein was operated in accordance with the prior art and the present invention. The feed mixture on a dry basis and by volume contained: 75.6 percent hydrogen; 15.6 percent carbon dioxide; 3.4 percent carbon monoxide; 4.8 percent methane and 0.7 percent nitrogen. In the prior art method of control, the feed cycle time was adjusted on the basis of product purity alone utilizing proportional integral control logic. The following table summarizes the results:

TABLE

|  | Prior Art Control | Present Invention Control |
| --- | --- | --- |
| Cycle Time | 540 | 606 |
| First Bed Layer | Zeolite | Zeolite |
| Amount of Adsorbent in First Bed Layer | 2150 lbs/Tons/Day Hydrogen | 2000 lbs/Tons/Day Hydrogen |
| Second Bed Layer | Activated Carbon | Activated Carbon |
| Amount of Adsorbent in Second Bed Layer | 1775 lbs/Tons/Day Hydrogen | 1700 lbs/Tons/Day Hydrogen |
| Third Bed Layer | Alumina | Alumina |
| Amount of Adsorbent in Third Bed Layer | 300 lbs/Tons/Day Hydrogen | 275 lbs/Tons/Day Hydrogen |
| High Pressure (psig) | 250 | 250 |
| Low Pressure (psig) | 6 | 6 |
| Feed Velocity (Ft³/hr (ntp) | 689 | 692 |
| Hydrogen Purity | 99.999% | 99.9985% |
| Hydrogen Recovery | 80.8% | 84.6% |
| Total Bed Size Factor | 4200 lbs/Tons/Day/ Hydrogen | 4000 |
| Temperature | 311 K. | 311 K. |
| Bed Diameter | 2.16 inches | 2.16 inches |
| Bed Length | 20 feet | 20 feet |

As is apparent from the table, the present invention control method, described above resulted in the cycle time being longer and the hydrogen recovery to be increased. The reduction in bed size factor indicates that more hydrogen is produced for the given quantity of adsorbent.

Figure 5:
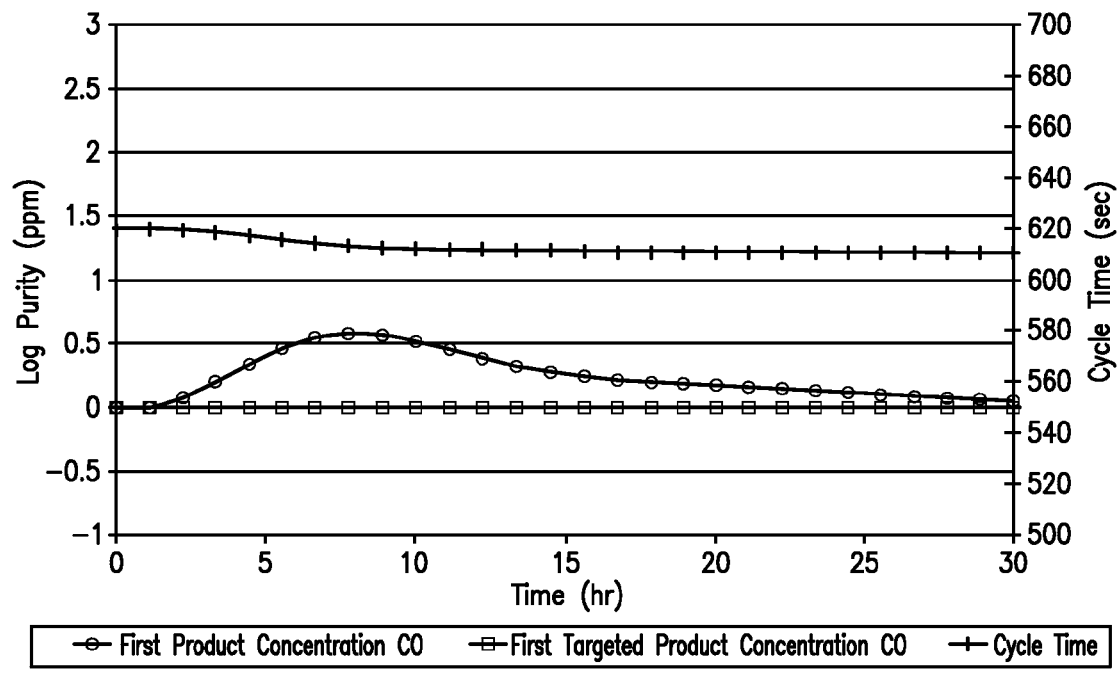
FIG. 5 is a graphical representation of the carbon monoxide product concentration of a pressure swing adsorption system illustrated in FIG. 2 controlled in a prior art manner in response to a disturbance.
Figure 6:
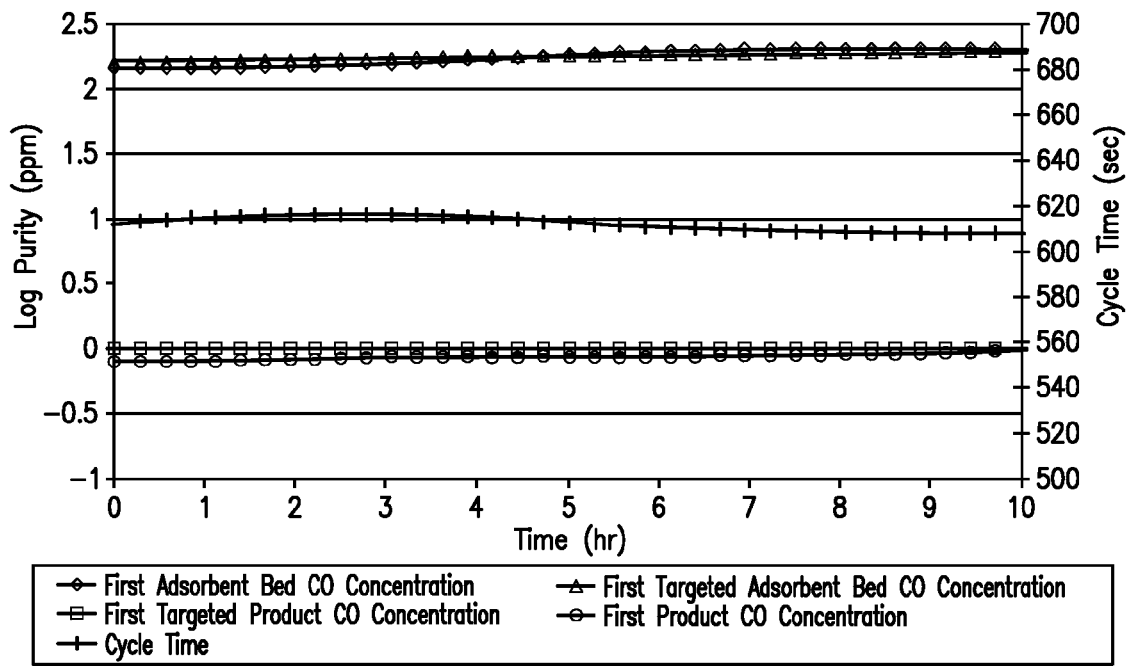
FIG. 6 is a graphical representation of the carbon monoxide product concentration of a pressure swing adsorption system illustrated in FIG. 2 controlled in a manner set forth in the present invention in response to a disturbance.

With reference to FIG. 5, an adsorbent bed unit 14 of FIG. 2 and having the features shown in the above Table was controlled in a prior art manner, that is a feed back control operating by proportional integral control and based upon the carbon monoxide concentration in the product stream 16. A disturbance was initiated by increasing the concentration of the carbon monoxide in the feed stream 12 from 4.5 percent to 5.5 percent. The feed stream mixture consisted of 74 percent hydrogen, 16 percent carbon dioxide, 5 percent methane, 4.5 percent carbon monoxide and 0.5 percent nitrogen before the disturbance and 73 percent hydrogen, 16 percent carbon dioxide, 5 percent methane, 5.5 percent carbon monoxide and 0.5 percent nitrogen after the disturbance. As is apparent from this Figure, an excursion in product purity of between 3 ppm and 4 ppm persisted for more than twenty hours. With additional reference to FIG. 6, an adsorbent bed unit 14 of FIG. 2 and having the features shown in the above Table was controlled in accordance with the present invention as described above. A disturbance was initiated by increasing the concentration of the carbon monoxide in the feed stream 12 from 4.5 percent to 5.5 percent. The feed stream mixture consisted of 74 percent hydrogen, 16 percent carbon dioxide, 5 percent methane, 4.5 percent carbon monoxide and 0.5 percent nitrogen before the disturbance and 73 percent hydrogen, 16 percent carbon dioxide, 5 percent methane, 5.5 percent carbon monoxide and 0.5 percent nitrogen after the disturbance. No noticeable excursion in the measured product purity was observed.

Figure 7:
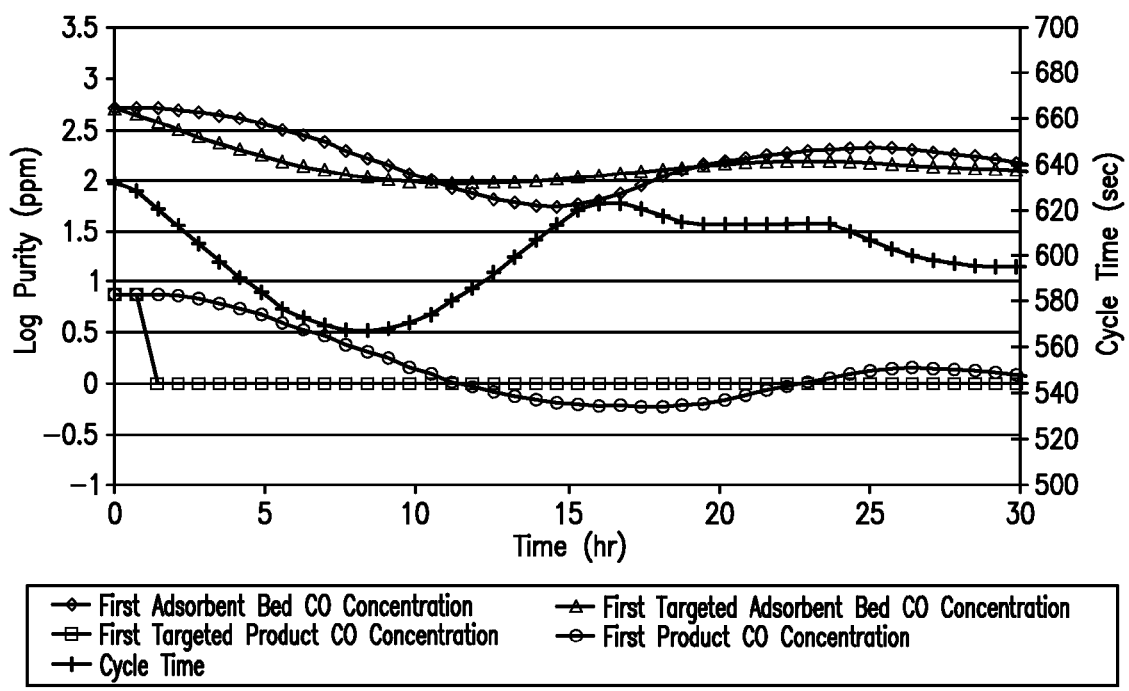
FIG. 7 is a graphical representation of the control of an adsorption system illustrated in FIG. 2 in accordance with the present invention illustrating the response of the adsorption system to resetting targeted product concentrations of carbon monoxide.

With reference to FIG. 7, a response in the control system described above is illustrated when the first targeted product concentration of carbon monoxide 158 was decreased from 7.5 ppm to 1 ppm carbon monoxide. As is apparent from this Figure, within ten hours, the first product concentration of carbon monoxide in the product stream 16 tracked the target with little deviation. In terms of the control response, the first targeted adsorbent bed concentration 158 determined by the supervisory level of control 42 decreases and after the ten hour period the first adsorbent bed concentration of carbon monoxide in the first layer 146 of adsorbent bed 32 begins to track the target. The feed cycle time that results from the primary control computations initially decreases given that the first product concentration of the carbon monoxide as measured is above the target. After the first product concentration of the carbon monoxide begins to approach the first targeted product concentration, the feed cycle time increases to allow for a greater hydrogen product recovery.

Although the present invention has been described to the control of a pressure swing adsorption unit used in connection with the production of hydrogen, the present invention has greater applicability. For example, the present invention has equal applicability to the control of an adsorption bed unit incorporating one or more adsorption beds in which a single adsorbent is used to adsorb two or more impurities. In such case, only a single critical impurity concentration would be sampled within the adsorption bed in the primary level of control and two or more impurities would be sampled within the product stream in the supervisory level of control. The product purity controller, as discussed above has a controller frequency that is set by the cycle time of the pressure swing adsorption unit 14. Thus, averages of the LOG10 purity levels are used in the computations. This has been found to be advantageous in that spikes of measured impurities will not effect the control of the pressure swing adsorption unit 14. This being said, it is possible to construct an embodiment of the present invention in which the control system operates at a greater frequency or virtually in a continual manner. The problem with such control would be that the feed cycle time cannot be continually adjusted and the unit would have to be programmed to discard an outlying result based upon a transient condition either in the feed or in the operation of the analyzers themselves. The advantages of using a LOG10 form of the data is that the control can function with the same response at both high and low impurity levels. If the impurity levels were within a narrow band as would be excepted with air purification applications, then in a simplified system, such LOG10 conversion might not be used.

As discussed above, the supervisory control level 42 and the primary control level 42 function on the basis of a velocity form of proportional integral control. It is possible that an embodiment of the invention could function on a position form and as such the proportional term would use simply the current error and the integral term would use the integral of the error. On another extreme, the control might be solely proportional. These latter two possibilities would be less desirable than the illustrated embodiment. Another possibility, though not as desirable as the illustrated embodiment, would be not to use the total cycle time, "$\Delta t$". Further embodiments of the present invention could use proportional, integral and derivative control is possible. Additionally, as would occur to those skilled in the art, each of the supervisory controllers 152, 154 and 170 and the primary controller 44 could each function on the basis of other control theory, such as fuzzy logic. Model predictive control is another type of control theory that could be used in connection with the present invention. In such a control scheme, the product impurity concentrations of nitrogen and carbon monoxide as well as the adsorbent bed impurity compositions of carbon monoxide and carbon dioxide. Additionally, feed flow, temperature and composition could optionally also be measured. All of the current and previous values of these variables, along with the historical values of feed cycle time would be fed to a predictive model. The predictive model would estimate what the product composition will do in the future based upon these values. An optimizer, a second part of the computer program, iteratively would calculate the requisite modification to the feed cycle time in order to minimize the difference between the measured product purity and the desired product purity. Once the optimal trajectory of feed cycle time in the future is calculated, the value of the feed cycle time nearest in time to the current feed cycle time would be selected and used as the current feed cycle time.

Another point that should be mentioned is that although the product purity controller 40 calculates a feed cycle time, that is a time at which an adsorbent bed is subjected to adsorption and the adsorption unit controller 34 responds to the result and increases the feed cycle time of each bed in a complete cycle, the end result is that the total cycle time is increased. As can be appreciated, the product purity controller 40 or any other type of control system, such as discussed above could function by the computation of the cycle time itself. Furthermore, certain adsorption bed unit controllers are programmed to be responsive to a capacity factor. Although the definition of capacity factor will vary with the manufacturer, commonly, the capacity factor is equal to a product of a design cycle time and design flow rate of the feed stream divided by a product of a current value of the flow rate of the feed stream and a value of the cycle time that is in use by the control unit. Since such an adsorption bed unit controller will have the necessary instrumentation to measure the flow rate, the design flow rate and cycle times represent operational rates for which the adsorption bed unit 14 is designed to operate, the same could be imported into the control equations given above or another type of system and rather than feed cycle time, the controller would determine a capacity factor for input into the adsorption control unit. Thus, it is accurate to state that any embodiment of the present invention could be generally said to compute a control parameter that will adjust the feed cycle time and that such control parameter could be the feed cycle time itself, the total cycle time or a capacity factor that is also a function of the cycle time and therefore the feed cycle time.

While the present invention has been discussed with respect to a preferred embodiment, as will occur to those skilled in the art, numerous changes and omissions can be made without departing from the sprit and scope of the invention as set forth in the appended claims.

We claim:

1. A method of controlling an adsorbent bed unit comprising:

measuring an adsorbent bed concentration of an impurity within an adsorbent bed of the adsorbent bed unit, the adsorbent bed adsorbing the impurity from a feed stream fed into the adsorbent bed, thereby to produce a product stream containing a product concentration of the impurity no greater than a targeted product concentration;

the adsorbent bed unit being operated in accordance with a cycle during which the feed stream is fed to the adsorbent bed and thereafter, the adsorbent within the adsorbent bed is regenerated through desorption of the impurity, the cycle incorporating a feed cycle time during which the feed stream is introduced into the adsorbent bed, the impurity is adsorbed and the product stream is produced;

controlling the product concentration within the product stream by calculating the feed cycle time employed within the adsorbent bed unit so that the adsorbent bed concentration tends to approach a targeted adsorbent bed concentration that will maintain the product concentration at a level no greater than the targeted product concentration and using the feed cycle time within the cycle after having been calculated, the feed cycle time being calculated so that the feed cycle time will decrease as the adsorbent bed concentration increases and will increase as the adsorbent bed concentration decreases; and the adsorbent bed concentration being measured within the adsorbent bed, at a location thereof, at which the adsorbent bed concentration will change before the product concentration of the impurity within the product stream changes in response to a disturbance so that controlling the adsorbent bed concentration to maintain the adsorbent bed concentration at the targeted adsorbent bed concentration will also maintain the product concentration of the impurity within the product stream at level no greater than the targeted product concentration.

2. The method of claim 1, wherein:

the adsorbent bed is configured to adsorb at least two impurities;

the impurity is one impurity of the at least two impurities, the product concentration is one product concentration of at least two product concentrations and the targeted product concentration is one targeted product concentration of at least two targeted product concentrations;

the at least two product concentrations and the adsorbent bed concentration are measured;

the feed cycle time is manipulated by continually calculating a control parameter that will set the feed cycle time within an adsorbent bed unit controller;

the control parameter is inputted into the adsorbent bed unit controller controlling valves within a flow control network connected to the adsorbent bed so that the feed stream is fed to the adsorbent bed during the feed cycle time;

the control parameter is calculated so that the adsorbent bed concentration will approach the targeted adsorbent bed concentration when the control parameter is inputted into the adsorbent bed unit controller;

the targeted adsorbent bed concentration is determined by calculating potential targeted adsorbent bed concentrations for each of the at least two impurities such that the product stream is produced having the at least two product concentrations at levels no greater than the at least two targeted product concentrations and utilizing a minimum value of the potential targeted adsorbent bed concentrations as the targeted adsorbent bed concentration so that control of the adsorbent bed concentrations will also control all of the at least two product impurity concentration to be less than the at least two targeted product impurity concentrations.

3. The method of claim 1, wherein:
the impurity is a first impurity, the adsorbent bed concentration is a first adsorbent bed concentration, the product concentration is a first product concentration and the targeted product concentration is a first targeted product concentration;
the adsorbent bed is configured to adsorb the first impurity and also a second impurity in a first layer of the adsorbent bed and a third impurity in a second layer of the absorbent bed located adjacent to and upstream of the first layer;
the adsorbent bed concentration controlled by manipulation of the feed cycle time is the first adsorbent bed concentration of the first impurity within the first layer so that the first adsorbent bed concentration will tend to approach the first targeted adsorbent bed concentration;
the first product impurity concentration and a second product impurity concentration of the second impurity are measured within the product stream, the first adsorbent bed concentration is measured in the first layer and a second adsorbent bed concentration of the third impurity is measured in the second layer at another location thereof selected so that a measurement of the third impurity concentration will indicate a change in impurity level before breakthrough of the second impurity to the first layer;
the feed cycle time is manipulated by continually calculating a control parameter that will set the feed cycle time within an adsorbent bed unit controller;
the control parameter is inputted into the adsorbent bed unit controller, the adsorbent bed unit controller controlling valves within a flow control network connected to the adsorbent bed so that the feed stream is fed to the adsorbent bed during the feed cycle time;
the control parameter is calculated so that the first adsorbent bed concentration will approach the first targeted adsorbent bed concentration when the control parameter is inputted into the adsorbent bed unit controller; and
the first targeted adsorbent bed concentration is determined by calculating potential first targeted adsorbent bed concentrations for the first impurity, the second impurity and the third impurity such that the product stream is produced having the first product impurity no greater than the first targeted product concentration and the second product concentration of the second impurity no greater than a second targeted product concentration and the second adsorbent bed concentration will be no greater than a second targeted adsorption bed concentration selected so as to prevent break through of the third impurity to the first layer and by utilizing a minimum value of the potential targeted adsorbent bed concentrations as the targeted adsorbent bed concentration so that control of the first adsorbent bed concentration will also control the first product concentration, the second product concentration and the second adsorbent bed concentration to be less than the targeted first product impurity concentration, the targeted second product impurity concentration and the targeted second impurity concentration, respectively.

4. The method of claim 2, wherein:
the control parameter is continually calculated within a product purity controller having a supervisory level of control that includes supervisory controllers to calculate the potential targeted adsorbent bed concentrations and a primary level of control that includes a primary controller to calculate the control parameter;
the product purity controller continually executes at a controller frequency; and
each of the supervisory controller and the primary controllers are proportional integral controllers.

5. The method of claim 3, wherein:
the control parameter is continually calculated within a product purity controller having a supervisory level of control that includes supervisory controllers to calculate the potential targeted adsorbent bed concentrations and a primary level of control that includes a primary controller to calculate the control parameter;
the product purity controller continually executes at a controller frequency;
the supervisory controllers and the primary controller are proportional integral controllers each having a proportional element, an integral element and each proportional element and each integral element having tuning factors;
each of the supervisory controllers calculates a potential first targeted adsorbent bed concentration of the potential first targeted adsorbent bed concentrations by adding to a previously calculated potential first targeted adsorbent bed concentration, the proportional element and the integral element;
each of the proportional and integral elements has an error term;
the first product concentration, the second product concentration, the first adsorbent bed concentration and the second adsorbent bed concentration are each continually measured and converted into logarithmic, base ten values that are averaged to produce an average logarithmic value;
the error term calculated: in a first of the supervisory controllers related to the first impurity by subtracting the average logarithmic value of the first product concentration from a base ten logarithm of the first targeted product concentration; in a second supervisory controller related to the second impurity by subtracting the average logarithmic value of the second product concentration from a base ten logarithm of the second targeted production concentration and in a third of the supervisory controllers related to the third impurity by subtracting the average logarithmic value of the second adsorbent bed concentration from a base ten logarithm of the second targeted adsorbent bed concentration; and
the error term is calculated in the primary controller by subtracting the average logarithmic value of the first adsorbent bed concentration from a base ten logarithm of the first targeted adsorbent bed concentration.

6. The method of claim 5, wherein the proportional element incorporates a difference between the error calculated during a current execution of product purity controller and the error calculated during a prior execution of the product purity controller.

7. The method of claim 5, wherein a period of the controller frequency is equal to a current total cycle time of the adsorption bed unit.

8. The method of claim 5 or claim 6, wherein the integral element is further determined by multiplying the current error by the current total cycle time.

9. The method of claim 8, wherein:
the cycle is a pressure swing adsorption cycle;
the adsorbent bed is one of a plurality of adsorbent beds;
the feed stream is a hydrogen containing stream and the product stream is a hydrogen product stream;
the first impurity is carbon monoxide;
the second impurity is nitrogen;
the third impurity is carbon dioxide;
the first layer contains a zeolite adsorbent and is located adjacent to an outlet of the adsorbent bed; and
the second layer contains an activated carbon adsorbent.

10. A control system for an adsorbent bed unit comprising:
a sampling portal located within an adsorbent bed of an adsorbent bed unit for sampling an adsorbent bed concentration of an impurity within the adsorbent bed, the adsorbent bed adsorbing the impurity from a feed stream fed into the adsorbent bed during a feed cycle time, thereby to produce a product stream containing a product concentration of the impurity no greater than a targeted product concentration;
a gas analyzer operatively associated with the sampling portal and configured to generate data referable to the adsorbent bed concentration;
a product purity controller responsive to the data and configured to calculate a control parameter that will set the feed cycle time employed within the adsorbent bed unit so that the adsorbent bed concentration will be controlled by the control parameter to approach a targeted adsorbent bed concentration that will maintain the product concentration of the impurity at the level no greater than the targeted product concentration, the control parameter calculated so that the feed cycle time decreases as the adsorbent bed concentration increases and increases as the adsorbent bed concentration decreases;
the sampling portal being situated at a location of the adsorbent bed at which the adsorbent bed concentration will change before the product concentration of the impurity within the product stream changes in response to a disturbance so that controlling the adsorbent bed concentration to approach the targeted adsorbent bed concentration will also maintain the product concentration of the impurity within the product stream at a level no greater than the targeted product concentration; and
an adsorbent bed controller responsive to the control parameter calculated by the product purity controller and controlling valves within a flow circuit of the adsorbent bed unit such that the adsorbent bed unit is operated in accordance with a cycle during which the feed stream is fed to the adsorbent bed during the feed cycle time and thereafter, the adsorbent within the adsorbent bed is regenerated through desorption of the impurity.

11. The control system of claim 10, wherein:
the adsorbent bed is configured to adsorb at least two impurities;
the impurity is one impurity of the at least two impurities, the product concentration is one product concentration of at least two product concentrations and the targeted product concentration is one targeted product concentration of at least two targeted product concentrations;
the gas analyzer is one gas analyzer of a plurality of gas analyzers that are positioned to generate data referable to the at least two product concentrations in the product stream and the adsorbent bed concentration; and
the product purity controller continually executes at a controller frequency to calculate the control parameter and includes a supervisory level and a primary level of control;
the supervisory level of control is configured to calculate the targeted adsorbent bed concentration from a minimum value of potential targeted adsorbed bed concentrations calculated within at least two supervisory controllers, the at least two supervisory controllers are responsive to the data referable to the at least two product concentrations and are configured to calculate the potential targeted adsorbent bed concentrations such that the product stream is produced having the at least two product concentrations at levels no greater than the at least two targeted product concentrations; and
the primary level of control having a primary controller responsive to a portion of the data referable to the adsorbent bed concentration and to the targeted adsorbent bed concentration calculated by the supervisory level of control and configured to calculate the control parameter from the adsorbent bed concentration and the targeted adsorbent bed concentration.

12. The control system of claim 10, wherein:
the impurity is a first impurity, the adsorbent bed concentration is a first adsorbent bed concentration, the product concentration is a first product concentration and the targeted product concentration is a first targeted product concentration;
the adsorbent bed is configured to adsorb the first impurity and also a second impurity in a first layer of the adsorbent bed and a third impurity in a second layer of the absorbent bed located adjacent to and upstream of the first layer;
the adsorbent bed concentration is a first adsorbent bed concentration of the first impurity within the first layer so that the first adsorbent bed concentration will tend to approach a first targeted adsorbent bed concentration, the product stream is produced also having a second product concentration of the second impurity no greater than a second targeted product concentration and a second adsorbent bed concentration of the third impurity within the second layer will be no greater than a second targeted adsorption bed concentration selected so as to prevent break through of the third impurity to the first layer;
the sampling portal is a first sampling portal and a second sampling portal is situated at a location of the adsorbent bed to sample the second adsorbent bed concentration of the third impurity within the second layer;
the gas analyzer is one gas analyzer of a plurality of gas analyzers positioned to generate data referable to the first product concentration, the second product concentration, the first adsorbent bed concentration and the second adsorbent concentration;
the product purity controller continually executes at a controller frequency and has a supervisory level of control and a primary level of control;
the supervisory level of control is configured to calculate the first targeted adsorbent bed concentration from a minimum value of potential first targeted adsorbent bed concentrations calculated within supervisory controllers responsive to the data referable to the first product concentration, the second product concentration and the second adsorbent bed concentration and configured to calculate the potential first targeted adsorbent bed concentrations such that the product stream is produced having the first product impurity concentration and the second product impurity concentration no greater than the first targeted product concentration and the second product targeted concentration, respectively and the second adsorbent bed concentration is no greater than a second targeted adsorbent bed concentration; and the primary level of control has a primary controller responsive to a portion of the data referable to the first adsorbent bed concentration and to the first targeted adsorbent bed concentration calculated within the supervisory level of control and configured to calculate the control parameter from the first adsorbent bed concentration and the first targeted adsorbent bed concentration.

13. The control system of claim 12, wherein:

the supervisory controllers and the primary controller are proportional integral controllers having a proportional element, an integral element and each proportional element and each integral element having tuning factors;

each of the supervisory controllers is configured to calculate a potential first targeted adsorbent bed concentration of the potential first targeted adsorbent bed concentrations by adding to a previously calculated potential first targeted adsorbent bed concentration, the proportional element and the integral element;

each of the proportional and integral elements having an error term;

the first product concentration, the second product concentration, the first adsorbent bed concentration and the second adsorbent bed concentration are each continually measured between executions of the product purity controller and converted into logarithmic, base ten values that are averaged to produce an average logarithmic value;

the error term calculated: in a first of the supervisory controllers related to the first impurity by subtracting the average logarithmic value of the first product concentration from a base ten logarithm of the first targeted product concentration; in a second supervisory controller related to the second impurity by subtracting the average logarithmic value of the second product concentration from a base ten logarithm of the second targeted production concentration and in a third of the supervisory controllers related to the third impurity by subtracting the average logarithmic value of the second adsorbent bed concentration from a base ten logarithm of the second targeted adsorbent bed concentration; and the error term is calculated in the primary controller by subtracting the average logarithmic value of the first adsorbent bed concentration from a base ten logarithm of the first targeted adsorbent bed concentration.

14. The control system of claim 13, wherein the proportional element incorporates a difference between the error calculated during a current execution of the supervisory controllers and the primary controller and the error calculated during a prior execution of the supervisory controllers and the primary controller.

15. The control system of claim 13, wherein the controller frequency is equal to a current total cycle time of the adsorption bed unit.

16. The control system of claim 13 or claim 14, wherein the integral element is further determined by multiplying the current error by the current total cycle time.

17. The control system of claim 16, wherein:

the cycle is a pressure swing adsorption cycle;

the adsorbent bed is one of a plurality of adsorbent beds;

the feed stream is a hydrogen containing stream and the product stream is a hydrogen product stream;

the first impurity is carbon monoxide;

the second impurity is nitrogen;

the third impurity is carbon dioxide;

the first layer contains a zeolite adsorbent and is located adjacent to an outlet of the adsorbent bed; and the second layer contains an activated carbon adsorbent.

* * * * *